(12) United States Patent
Long (10) Patent No.: US 6,669,546 B2
(45) Date of Patent: Dec. 30, 2003

(54) SHOCK-WAVE MEAT TREATMENT (75) Inventor: John B. Long, Sarasota, FL (US)

(73) Assignee: Hydrodyne, Inc., Sarasota, FL (US)

( * ) Notice: Subject to any disclaimer, the term of this patent is extended or adjusted under 35 U.S.C. 154(b) by 0 days.

(21) Appl. No.: 10/005,763

(22) Filed: Dec. 7, 2001

(65) Prior Publication Data

US 2002/0072318 A1 Jun. 13, 2002

Related U.S. Application Data (60) Provisional application No. 60/251,881, filed on Dec. 8, 2000, provisional application No. 60/251,880, filed on Dec. 8, 2000, and provisional application No. 60/292,513, filed on May 23, 2001.

(51) Int. Cl.$^7$ ............................................... A22C 9/00
(52) U.S. Cl. ..................................................... 452/141
(58) Field of Search ........................ 452/141; 426/234, 426/237, 238, 239; 99/451

(56) References Cited

U.S. PATENT DOCUMENTS

| | | |
|---|---|---|
| 2,078,641 A | 4/1937 | Spencer |
| 2,544,681 A | 3/1951 | Harsham et al. |
| 2,830,912 A | 4/1958 | Simjian |
| 2,880,663 A | 4/1959 | Simjian |
| 2,881,080 A | 4/1959 | Simjian |
| 2,902,712 A | 9/1959 | Simjian |
| 2,980,537 A | 4/1961 | Hagen |
| 3,220,873 A | 11/1965 | Wesley |
| 3,492,688 A | 2/1970 | Godfrey |
| 3,594,115 A | 7/1971 | Wesley et al. |
| 3,611,766 A * | 10/1971 | Klein et al. ....................... 72/56 |
| 3,711,896 A * | 1/1973 | Guberman et al. .......... 452/141 |
| 3,743,523 A * | 7/1973 | Bodine ........................ 426/238 |
| 3,961,569 A * | 6/1976 | Kenyon et al. ................ 99/451 |
| 4,353,928 A | 10/1982 | Seliger et al. |
| 4,458,153 A | 7/1984 | Wesley |
| 4,464,401 A * | 8/1984 | Kissam ........................ 426/238 |
| 4,496,594 A * | 1/1985 | Miyahara ..................... 426/234 |
| 4,504,498 A * | 3/1985 | Kissam ........................ 426/238 |
| 4,522,834 A * | 6/1985 | Miyahara ..................... 426/231 |
| 5,026,484 A * | 6/1991 | Juvan .......................... 204/571 |
| 5,256,430 A * | 10/1993 | Suzuki et al. ................ 426/237 |
| 5,328,403 A * | 7/1994 | Long .......................... 452/141 |
| 5,368,724 A | 11/1994 | Ayers et al. |
| 5,397,961 A | 3/1995 | Ayers et al. |
| 5,588,357 A | 12/1996 | Tomikawa et al. |
| 5,611,993 A | 3/1997 | Babaev |
| 5,841,056 A * | 11/1998 | Long et al. .................... 86/50 |
| 6,120,818 A * | 9/2000 | Long .......................... 426/238 |
| 6,146,262 A | 11/2000 | Long et al. |
| 6,168,814 B1 | 1/2001 | Long |
| 6,200,615 B1 | 3/2001 | Long |
| 6,206,773 B1 * | 3/2001 | Waits .......................... 452/141 |
| 6,224,476 B1 * | 5/2001 | Long et al. ................. 452/141 |
| 6,264,543 B1 * | 7/2001 | Garcia et al. ............... 452/141 |
| 6,306,029 B1 | 10/2001 | Long |

* cited by examiner

*Primary Examiner*—Thomas Price
(74) *Attorney, Agent, or Firm*—Browdy and Neimark, P.L.L.C.

(57) ABSTRACT

Improved tenderization of meat is achieved by using, individually or in combination, (1) a capacitor discharge chamber of shortened height; (2) a drum-head on which the meat sits during treatment and which is located at the upper end of the capacitor discharge chamber; (3) meat supporting structure which substantially holds the meat in place on the drum-head during capacitor discharge; (4) an indexing carousel for delivery the meat to a location above the capacitor discharge chamber and for transporting the treated meat to a discharge location; (5) an improved negative compression or rarefaction wave; and (6) the combination of shock wave treatment with other operations.

35 Claims, 5 Drawing Sheets

SHOCK-WAVE MEAT TREATMENT

CROSS REFERENCE TO RELATED APPLICATIONS

This application claims the benefit of U.S. provisional applications Nos. 60/251,881, filed Dec. 8, 2000; 60/251,880, filed Dec. 8, 2000; and 60/292,513, filed May 23, 2001. The contents of these three provisional applications are entirely incorporated by reference herein.

FIELD OF INVENTION

The present invention relates to the processing of meat for tenderization and/or the killing of bacteria in the meat, by subjecting the meat to shock waves which are plasma waves or pulses generated by capacitive discharge between two electrodes.

BACKGROUND AND REVIEW OF RELATED TECHNOLOGY

Meat can be tenderized and at least partially sterilized by shock waves, i.e. acoustic or pressure pulses, from explosions caused by a chemical explosive charges or a capacitive discharge between two electrodes, such as shown in the U.S. Pat. Nos. 5,273,766; 5,328,403; 6,120,818 and 6,168,814 B1 in the name of John Long, and U.S. Pat. No. 6,224,476 B1 in the name of Long et al. A shock wave travels outwardly from the explosion site at the speed of sound, or somewhat higher in the case of high-intensity shock waves; and, like an audible sound echoing from a wall, will reflect from a shock-wave reflective surface.

The condition for reflection of a shock wave is that the speed of sound, which varies depending on the medium through which it travels, changes at an interface between two different media. A pressure wave travels in water at about 1500 meters per second, faster than its rate of travel through air; the same wave travels in stainless steel at 5800 meters per second, nearly four times faster than its rate through water. This difference in the speed of sound is close to the difference in speed for shock waves, which are basically high pressure sound waves; they propagate by the same mechanism as sound does, but are sharp pulses and typically have a much higher sound intensity or pressure rise (sometimes called "overpressure") than most sounds.

When a sound or shock wave in water encounters a steel surface, most of the wave is reflected away from the surface because of the difference in speed (also referred to as an "acoustic impedance mis-match"), with only a small portion passing into the steel. In some of the aforementioned related patents, the reflection of shock waves from a thick steel surface was used to increase the intensity of the shock pulse. The pulse of the shock waves from an explosion is brief but has an appreciable length, and when the pulse is reflected from steel it passes through itself, increasing the shock wave pulse intensity. (The same effect is seen at a seawall, where ocean waves reflecting from the wall splash to a greater height up the wall than they reach in open water.)

In a preferred embodiment according to Long '766 and '403, the meat was placed in plastic bags which were lined along the bottom of a hemispherical steel shell, the shell was filled with water, and an explosion was set off in the geometrical center. The shock wave traveled outwardly to reach all the meat at roughly the same time and hit the meat with roughly the same overpressure or shock wave intensity, passing through the packaging film and meat twice due to the reflection from the steel shell. (The meat and the enclosing bags, having an acoustic or mechanical impedance close to that of water, do not appreciably reflect the shock pulse.)

This earlier embodiment works very well in tenderizing and at least partly sterilizing the meat lined along and adjacent the inner wall of the shell, but it has some drawbacks. Importantly, this embodiment is inherently a batch operation, and the equipment is expensive. A stainless steel hemisphere four feet in diameter and two inches thick is not inexpensive, and the equipment needed for moving blast shields, water changers, and so on is complex and costly. Packing and removing the meat is slow, and further delays are mandated by safety concerns; workers should not load the hemisphere while the explosive is rigged, for example.

Another drawback is that the water is blown upwardly out of the hemispherical shell by the explosion and must be replenished. In the case of chemical explosives, it is preferable to drain off any remaining water and replace it with fresh water which is untainted by chemical by-products of the explosion, even though such water does not even come directly into contact with the meat. This draining and replenishing takes time and uses a great deal of water.

Also, the explosive force in the aforementioned embodiment is not balanced. The geyser of blast gases, steam, and spray out the top of the hemisphere causes a large reaction force which drives the hemisphere downwardly, and this must be resisted by large springs, dashpots, and so on, this additional equipment also being expensive and tending to deteriorate too quickly. A special blast-shield dome above the shell as in Long U.S. Pat. No. 5,841,056 is needed to absorb the force of the geyser.

placing the meat into protective plastic bags causes additional problems as well, and is preferably avoided.

The placement of the meat against or in near adjacency to the surface of the shock-wave reflective steel is the root of some of the difficulties with previous embodiments as discussed above, and such placement has limitations which prevent any substantial improvement. The width of the layer of meat which can be tenderized is limited by the duration of the shock pulse, because if all the meat is to be subjected to intensity doubling then the thickness of the shock pulse must be at least twice the thickness of the meat, so that the pulse intensity will be doubled throughout the thickness of the meat. If the pulse is of very short duration, its trailing edge will have passed into the meat layer just as the leading edge is reflecting from the steel, and only the portion of meat closest to the steel will experience the doubled shock intensity; the rest will undergo two passes of the non-doubled shock wave. The width of the shock pulse in meters is roughly 1500 m/s divided by the pulse duration in seconds.

Limiting the thickness of meat means that the size of the hemisphere must be increased if each batch of meat to be treated is to be large enough that the overall processing rate is not too slow. But increasing the hemisphere diameter means that the shock pulse will be weaker, since the pressure intensity of a spherical wave falls off approximately as the cube of the radius (which corresponds to the distance from the source or sources of the explosion).

If the intensity doubling of the earlier embodiments were not insisted on, then the layer of meat could be spaced further away from the shock-wave reflective inner surface of the hemispherical shell, and the greater intensity of the shock wave would make up for the intensity doubling. If the meat were moved inwardly by about 29% of the hemisphere radius (precisely, 1.000 minus 0.707) then the single-pass shock wave intensity would be just as great as the doubled intensity at the inner surface of the hemisphere, even if the explosion energy were not increased. (The shock wave would pass outwardly through the meat and then, after reflection from the steel surface, pass back inwardly through the meat.) This shows that placing the meat directly against or closely adjacent a reflective surface is not essential.

However, the problem then arises as to how the meat can be supported against moving away from the explosion. Such problem is solved in the aforementioned Long U.S. Pat. No. 6,168,814 B1 by making the container "acoustically transparent" so that the shock wave will pass through the container without being significantly diverted in direction or delayed in passage.

There are several ways to make a container acoustically transparent. One is make the container of wires, which sound (and a shock wave) can pass around, but a wire container will not in all cases adequately support the meat; and, depending on the size of the wires or rods from which it is formed, will interfere with the shock wave. A preferred way, though, is to make the container of a material having roughly the same "acoustic impedance" as the liquid in which it is immersed. If the impedances of the container material and the liquid are about the same, then the shock wave will have the about the same speed in both materials. According to Huygens' principle, the waves then will not be bent by refraction. Neither will they reflect from the interface between the liquid and container material.

(An analogy can be made to light waves. If a solid object immersed in water has an "index of refraction" (optical impedance) close to that of the water, it will be nearly invisible because the light rays passing through it will not bend. For example, a piece of clear ice or glass is less visible in water than in air, because there is little difference between the indices of refraction.)

If the liquid is water as is preferred, the container may be made of a material in which the speed of sound is similar. Such materials are available. In gum rubber, for example, the speed of sound is only 3% higher than in water, and several more durable plastics are close enough in their acoustic impedances to water that they are quite suitable for the meat container. One suitable and well-known material, which is approved for use with food, is TYGON, which is a plasticized vinyl polymer; others are polyethylene and polypropylene. Other plastics can be routinely tested for acoustic transparency and durability in the explosive environment. If a hemispherical meat container made of TYGON or the like were suspended concentrically inside the hemispherical shell, the meat could be tenderized without the need for reflection, as discussed above.

But this would not eliminate all the problems with the earlier embodiments, namely the need for batch processing and the associated slowness and complex equipment. In order to attain either continuous processing, semi-continuous or intermittent processing, or improved batch processing, the later embodiments exchanged the earlier hemispherical geometry for an essentially cylindrical geometry, while in some embodiments the batch container was exchanged for a conduit (e.g. a TYGON tube) through which the meat product is pumped or carried in the case of hamburger or the like (i.e. a slurry) or by flowing water in the case of pieces of meat, e.g. de-boned chicken parts or plastic film wrapped beef. The advantages of a solid pipe of suitable-impedance plastic, substantially transparent to the shock wave, as compared to a conduit made of fine mesh, are evident in relation to food transport; such a tube is also more "transparent" to shock waves than is a mesh or framework. TYGON, and other suitable plastics, are available in the form of tubing.

Consequently, in Long U.S. Pat. No. 6,168,814 B1, a hollow and roughly cylindrical shock reflector surrounds the plastic conduit or static meat holder so that the shock waves are internally reflected. Even if the geometry is not so precise that shock wave reflections are perfectly arrayed, the reflector serves as a reverberant chamber in which the many shock wave echoes produce a quasi-hydrostatic pressure pulse.

As the meat is pumped through the plastic conduit in the case of such a continuous system, explosions are set off near the conduit repeatedly, at short enough intervals so that all of the meat passing through the conduit is exposed to shock wave treatment. All reflections of shock waves are preferably from surfaces at a distance from the plastic conduit and the meat.

The meat in such a continuous process is preferably subjected to a plurality of shock wave passages in short succession, which create the quasi-hydrostatic pressure wave effect of overlapping pulses, either through overlapping of the shock waves and a consequent increase of the shock intensity, or by failure of the meat or bacteria therein to "recover" from one shock before the next shock quickly arrives. The shock waves may impinge on the meat either directly, by reflection, or after plural reflections from a number of surface areas of the reverberant cylindrical chamber.

From a single explosion generated from either a chemical explosive or a capacitive discharge, a spherical shock wave expands rapidly and uniformly until it encounters a change in acoustic impedance and is reflected or refracted. With a proper arrangement of reflective surfaces the expanding spherical shock wave from the single explosion can be diverted and reflected so that the reflections impinge on the meat in the conduit from several directions in a short time.

If the "rays" (portions of the wave front traveling perpendicular to the wave front surface) all travel the same distance to reach the conduit, then the waves will impinge on the meat inside the conduit simultaneously.

SUMMARY OF INVENTION

While the prior embodiments of Long including those mentioned above work very well, further improvements have been achieved according to the present invention, including the provision of less costly equipment, improved efficiency, and greater effectiveness. These improvements have been brought about by a number of changes, each one of which provides a degree of improvement, and which in combination provide very significant improvements.

Among the changes, which may be used individually or in combination, are (1) changes in the geometry of the capacitor discharge chamber; (2) the replacement of a tubular chamber for containing the meat with a "drum-head" on which the meat sits and which is located at the upper end of the capacitor discharge chamber; (3) the provision of meat supporting structure which substantially holds the meat in place on the drum-head during capacitor discharge, and at least a portion of which optionally accompanies the meat through several stages of its movement; (4) a simplified indexing carrousel for delivering the meat to a location above the capacitor discharge chamber and for transporting the treated meat to a discharge location; (5) the more effective provision of a rarefaction or negative compression wave; and (6) the provision of certain improvements in tenderization involving subjecting the meat, especially boneless chicken breasts, to shock wave treatment in combination with other operations.

BRIEF DESCRIPTION OF THE DRAWINGS

The nature and advantages of the present invention will become more apparent from the following detailed description of a preferred embodiment, along with certain disclosed options and alternatives, taken in conjunction with the drawings, wherein.

DETAILED DESCRIPTION OF THE PREFERRED EMBODIMENT INCLUDING VARIATIONS

Figure 1:
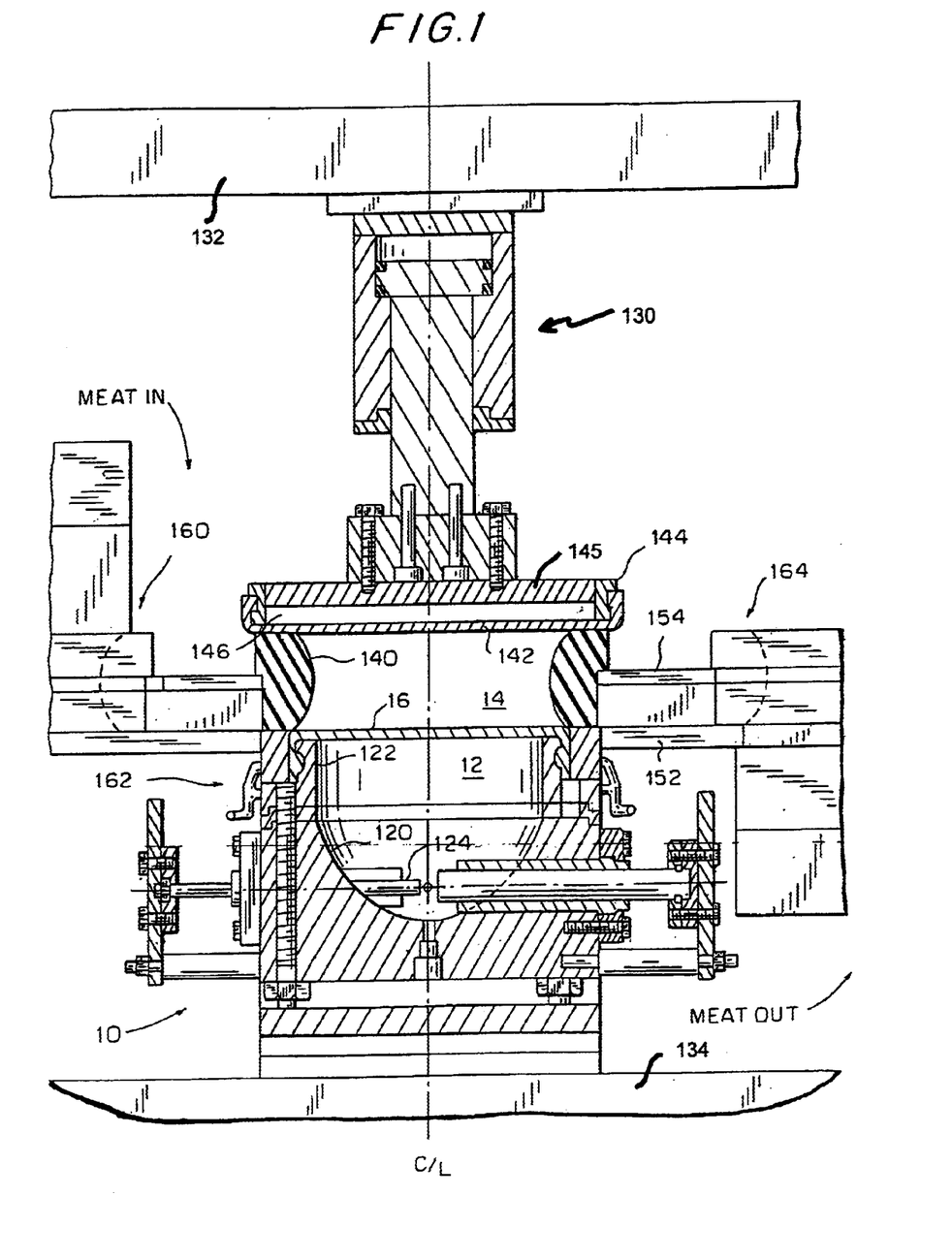
FIG. 1 is an elevation view partly in section of a preferred embodiment of the present invention, showing the capacitor discharge chamber, the meat treatment chamber, the meat supporting structure, and associated apparatus.

The attached FIG. 1 of a preferred embodiment according to the present invention shows a meat treatment apparatus 10 comprising two main chambers, namely the lower capacitor discharge or firing chamber 12 and immediately thereabove the food processing chamber 14, supported by a lower support structure 134.

Figure 2:
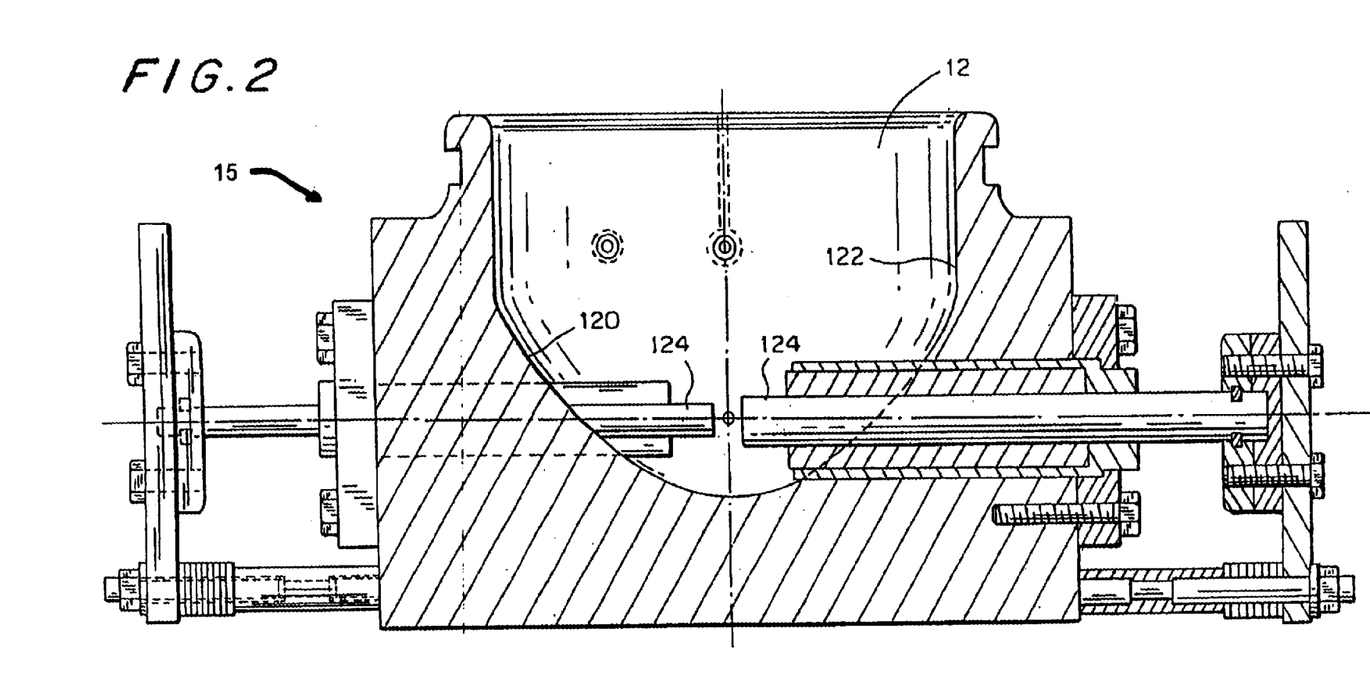
FIG. 2 is an enlarged sectional view of the capacitor discharge chamber thereof showing presently preferred dimensions.

The capacitor discharge chamber 12, filled with water, brine, or another so-called incompressible fluid, consists of a parabolic shaped bowl 120 at the bottom and a substantially circular-cylindrical upper portion 122 which may be slightly cone shaped wherein the angle the side of the cone makes with the center line is less than 15°, preferably less than 8° and most preferably 0°, i.e. the upper portion 122 is preferably substantially circular-cylindrical, it being understood however that the circular-cylindrical form need not be a perfect circular-cylinder.

Two electrodes 124 enter the parabolic shaped bowl 120 horizontally and are adapted to deliver 12–19 Kj. The centerline of the electrodes passes through the focus of the parabola. When the electric pulse is fired, a shock wave is emitted spherically from the parabolic focus.

As the shock wave expands, each point on the expanding shock front has both magnitude (pressure) and direction. Therefore, each point on the expanding sphere can be considered the leading point of a vector passing through the center of the parabolic focus. As a result, the rays reflected from the surface of the parabolic shaped bowl 120 will be reflected in a direction parallel to the axis of the parabola. These will proceed through the opening into the food processing chamber 14. Any rays which intersect with the sides of the upper portion 122, e.g. due to possible taper at less than 15°, do so at an angle less than 15 degrees, and lose little energy as a result.

A "drum-head" 16, described below, separates the capacitor discharge chamber 12 from the food processing chamber 14. In use, meat is placed on the drum-head 16, and an electric pulse is fired causing the shock wave to pass from the chamber 12 through the drum-head 16 and penetrate the meat, causing tenderization of the meat and killing of a significant proportion of any bacteria which may be present.

The circular-cylindrical form of the firing chamber 12 provides a more uniform pressure across the drum head 16, with the opening for the drum-head 16 becoming the major diameter of the parabolic bowl.

A first series of tests were conducted to determine the optimum distance from the arc to the drum-head 16 to produce the maximum pressure. Using an 8 inch (i.e. about 20.3 cm) diameter for the parabolic portion of the firing chamber 12, but with no taper of the upper portion 122, so that the upper portion 122 also has a diameter of about 20.3 cm, with a distance of 11.5 inches (i.e. about 29.2 cm) from the focal point where the arc is generated to the drum-head 16, good results were achieved.

However, when we shortened the height of the chamber 12 from focal point to the drum-head to a range of 4–8 inches, i.e. 10–20 cm, even better results were achieved. In a second series of tests with such vertical distance being in the range of 10–20 cm, and especially 14.6 cm (5¾ inches), it was demonstrated that both chicken and beef are tenderized uniformly at a fraction of the full power of the capacitor discharge. The height of the upper portion 122 of the chamber 12 is therefore desirably less than its radius.

As indicated above, while the configuration of the firing chamber 12 above the parabolic section and below the drum-head 16, i.e. the upper portion, is preferably circular-cylindrical, it can deviate to some extent as indicated above and still achieve superior results. Thus, the angle of inclination can vary between 8° positive and 8° negative, preferably 2° positive and 2° negative without significant lowering of effectiveness.

Insofar as the height of the circular-cylindrical portion is concerned, it is noted above that the optimum distance between the focal point of the parabola between the electrodes and the drum-head for the illustrated embodiment is 5¾ inches, namely 14.6 cm. However, as also indicated above, this distance may suitably vary between 4 inches and 8 inches, i.e. about 10–20 cm. In each instance, the equipment should be routinely tested to determine the best height of the chamber.

In the illustrated embodiment, the full power of the capacitor discharge machine was 16 Kj. In the tests conducted, the optimum power for treating deboned chicken breast was about 12.8 Kj. The optimum power for the treatment of beef was about 11.5 Kj. The use of too much power can result in damage to the meat. Therefore, in each case the power level to be used should be determined by routine testing.

Experiments with tenderizing meat products with high pressure shock waves of about 30,000 to 50,000 psi have shown that tenderization occurs when shock waves pass through the meat from different directions, colliding in the meat product. Here, the tenderization process is due to breakage of the meat fibers as a result of shear in the meat fibers. However, a tenderization effect two to three times that of the shear mechanism occurs when the meat product under compression from a positive shock wave is suddenly relieved of the compression effect. Here, the meat product suddenly expands, going through zero compression, and because of momentum into a tension state. This phenomenon breaks tissues which cause toughness and produces a tender product from the lowest grades of meat.

In order to produce this tension state phenomenon, it is necessary to produce an environment that will allow the compression wave to suddenly unload. A shock wave produced in the selected medium, preferably water, will reflect positively from a collision with an object in that medium, if the object is denser (higher mechanical impedance) than the medium in which it was generated. In this case, the shock reflects back through the incoming wave producing an increased pressure in the wave. However, if the object has a lower mechanical impedance, the wave unloads producing a refractory (negative or tension) wave in the product. If a positive shock traverses water, and reaches an air interface, the wave unloads producing a tension wave in the water. However, the wave will not propagate in water because the water cannot experience tension. The result is cavitation in the water. If however the positive compressive shock wave is in the meat, and the meat is at an air interface, the meat can withstand the tension, and tension progresses through the meat breaking fibers.

As explained above, a positive shock wave will pass through any material in the medium in which the wave is generated that possesses the same mechanical impedance as the medium, and reflect as a positive wave from any material in the medium which possesses a mechanical impedance which is larger than that of the medium in which the wave was generated. The mechanical impedance in the materials with which the present system is involved is primarily controlled by the density of the materials. Meat and water, and most plastics, are close to or essentially a mechanical impedance match. So when a shock wave passes through meat and then runs into steel, the wave reflects, and is a positive wave.

If however, the wave passes through meat, and then hits air, the wave pressure unloads at the surface barrier, and then reflects back through the already pressurized meat as an unloading wave, or in other terms, a so-called negative wave or rarefaction wave. In designs where the shock wave has passed through meat, has then reflected from steel, and because of the geometry of the shot, the water has been removed from the surface of the meat, the wave then hits a mixture of gases and water droplets, and unloads backward as a negative wave. Results of these geometries have produced tenderizing effects from 50% to 100% greater than where no negative wave existed.

With respect to experiments with a drum-head construction, a cube of meat (beef) was placed on the drum head, and varying amounts of water were placed around the meat. When water was placed so that only the top of the meat was exposed, a negative wave went backward through the meat, and results were similar to those produced in earlier disclosed embodiments. When water was only half way up the cube of meat, the tenderizing effect was larger. When only a small amount of water (for improved coupling) was under the meat cube, the tenderizing effect was appreciably greater. In this last case, the coupling occurred on only one side of a six-sided cube. Once the shock wave passed through the meat, it found an air interface on five sides of the meat cube. In this instance we observed tenderness improvements at least 50% better than those achieved by our experiments using earlier embodiments with chemical explosives.

Since the meat is not a perfect acoustic match with water, a small force propelled the meat upward. (If meat were a perfect acoustic match with water, no tenderizing effect would occur). Here, preferred constructions utilize a meat catcher preferably having a smooth surface above the meat to restrain the meat or deflect the meat back to the drum-head, or onto the exit conveyor.

Experiments were done with chicken breasts using a drum-head construction. In one experiment, chicken breasts were stacked like "Lincoln logs" to make a cube about five inches on a side. In this experiment, the breasts at the top were tenderized more than those on either the bottom or the center of the stacked cube. Presumably because of voids between the chicken breasts, the negative wave was diluted in its backward reflection. The experiment was repeated with the breasts compacted in a stockinette. In this case, all of the breasts were tenderized to a commercially acceptable standard. This example indicates that where chicken is concerned, e.g. chicken breasts, the chicken pieces will desirably be compressed to eliminate voids in the stack. This can be done with a Tygon sheet placed above the chicken which compresses the chicken, and still leaves air above the Tygon sheet.

It appears that the Hydrodyne process, including prior embodiments and embodiments according to the present invention, breaks up bundles of muscle fibers, thus increasing exposed area for the enzymes to work on the meat, which enzymes act to increase tenderness of the meat. (Age tenderizing is a result of enzyme action on various meat fibers.) Further, many enzymes are trapped in cells. These are released when the cells are broken by the shock wave. So, many more enzymes have much more area to work on, and the result is accelerated aging. This appears to be more dramatic with chicken than with beef.

The chicken breasts tenderized by the very successful stockinette chicken experiment described above were cooked and tested one day after shooting. The delay of cooking the chicken one or two days after shooting would not be a problem in marketing, and improves tenderness even more. Accordingly, another aspect of the present invention is to age meat or chicken for at least about twenty-four hours and preferably two days, following treatment by the Hydrodyne process.

To produce the above-described phenomenon in the food processing chamber 14, the meat should be flat against the drum-head 16. As this is sometimes difficult, depending on the cut of meat, and particularly in the case of boneless chicken breasts, it may be desirable to provide a very shallow pool of water above the drum-head 16 to eliminate the possibility of any air interface between the incoming shock wave and the bottom surface of the meat resting on the drum-head 16. However, in the case of the treatment of beef, such a pool of water should be avoided unless the meat is prepackaged in a plastic wrap to prevent contact between the water of such shallow pool and the meat itself. Moreover, actual practice has revealed that the shallow pool of water is usually unnecessary, because the drum-head 16 itself is sufficiently flexible and elastic so that any air cavities between the bottom surface of the meat and the drum-head at rest are filled by deformation of the drum-head driven upwardly by the incompressible fluid within the capacitor discharge chamber 12 upon capacitive discharge.

Above the meat is air. The positive shock wave passes through the liquid in the capacitor discharge chamber 12, through the drum-head 16, which is roughly an acoustic match with the liquid, and then through the meat. When the wave passes through the meat and reaches air, the wave jumps off into the air producing a rapid unloading or tension wave in the meat, and because the meat can support a tension wave, the wave propagates through the meat, thus increasing the tenderizing effect.

As indicated above, one of the changes provided in the present invention which yields improved results over the results achieved according to prior embodiments involves changes in the geometry of the capacitor discharge chamber. Thus, in accordance with a preferred embodiment of the present invention and as explained above, the discharge chamber 12 has a relatively short upper portion 122 above the parabolic section 120. The preferably circular-cylindrical upper portion 122 also preferably has a height which is no greater than its radius, and more preferably less than its radius. If the radius is four inches, the height of the section 122 is only about three and three-quarters inches. Of course, the size of the apparatus can be scaled upwardly. Other dimensions can be selected on the basis of routine experimentation. The selection is based on a distance from the optimum tenderizing effect on meat. At this distance, the cylinder 122 ends.

The surface perpendicular to the axis of the cylinder 122 is substantially flat. On this flat surface a flexible plastic sheet is placed in the nature of the "drum-head" 16. The plastic is chosen for its flexibility and elasticity, for its mechanical impedance match with water (with which the parabolic bowl and cone are filled) and preferably for its ability to withstand repeated shock waves and distortions imposed by the non-compressible fluid therebeneath driven upwardly by the shock waves. Tygon, a somewhat elastic version of polyvinyl chloride, has been found acceptable as has a low durometer version of polyurethane. Gum rubber is preferred due to its better durability. Other plastics and elastomers can be routinely tested for suitability.

Figure 3:
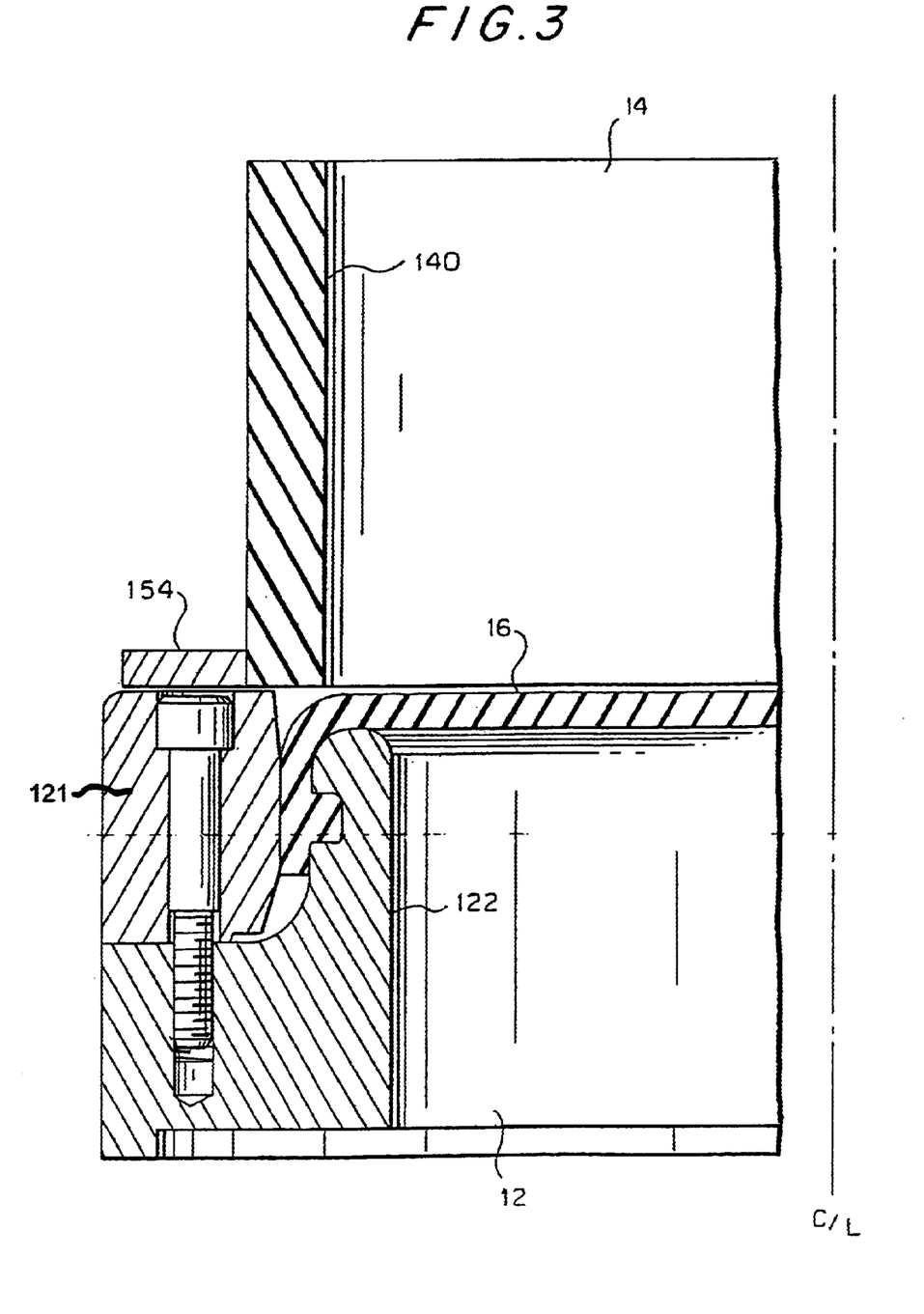
FIG. 3 is an enlarged partial sectional view of part of the meat supporting chamber and part of the capacitor discharge chamber thereof.

Thicknesses between 3/16 inch and 3/8 inch for the drum-head 16 have been tested and are satisfactory. Preferred is a gum rubber sheet of thickness approximately one-quarter inch, i.e. about 0.6 cm. This drum-head is desirably held in place and sealed by a stainless steel holding ring 121 that bolts to the firing chamber 12. Such a ring may optionally also extend upwardly a short distance to provide a shallow lip extending peripherally about the drum-head for retaining the optional shallow pool of liquid on the drum-head surface. As indicated above, the firing chamber is filled with water or other non-compressible fluid so that the bottom surface of the flexible sheet or drum-head is in contact with the water.

The meat to be treated is placed on the drum-head 16, and must acoustically couple with the drum-head. If the surface of the meat that is to be in contact with the drum-head is irregular, the aforementioned small amount of water or other suitable liquid may be provided on the drum-head to improve coupling retained by the aforementioned lip. Hamburger, which is easily molded, will provide an acoustically matching surface, and therefore will not require a water interface. Moreover, as already indicated above, the shallow pool of water or liquid is normally unnecessary because the drum-head 16 is sufficiently flexible and elastic so that, upon capacitive discharge within the chamber 12, the upwardly moving incompressible fluid beneath the drum-head 16 will "mold" the drum-head against the irregular bottom surfaces of the meat residing thereon, thus insuring an acoustic coupling between the meat bottom and drum-head 16.

It should be noted that with the disclosed configuration, the water or other non-compressible fluid around the electrodes 124 and in the cylindrical upper portion 122 of the firing chamber 12 is never in contact with the food, i.e. this water is in a completely contained system. In previous experiments with tenderizing meat in which high explosives were used, the meat shared the same water that contained the explosive. As a result, the meat needed to be contained in evacuated plastic bags. The bags added cost to the process, and also had an undesirably high rate of failure. With the use of a drum-head 16 on the firing chamber 12, no meat bags are required.

The meat may be introduced to the drum-head 16 by a more or less conventional conveyor system, and pushed across the drum-head by the meat on the conveyor system. The conveyor may have upwardly extending flanges (not shown) to ensure that the meat does not slide on the conveyor surface; these flanges are preferably spaced a distance apart equal to the diameter of the drum-head, with pieces of red meat or chicken to be treated being placed between these flanges. Another conventional conveyor system will move the meat from the drum-head and to a shipping area. The conveyors may move continuously or preferably intermittently.

As noted above, because the meat is not a perfect acoustic or mechanical impedance match with water through which the shock wave is conveyed through the drum-head 16 and then to the meat, a small force propels the meat upwardly. In this case, a suitable meat catcher surface will be supplied to deflect the meat back to the drum-head surface.

It has now been found, however, that the force propelling the meat upwardly is sometimes so great as to cause superficial or cosmetic damage to the meat, thus making the meat unsalable or salable only at a substantially reduced price. While the meat fibers appear to be substantially an acoustic or mechanical impedance match with water, the tissues that contribute to toughness are not, and it is these latter tissues that energy from the shock wave break in order to produce a more tender product. The result is that tougher grades of meat, i.e. those grades having more tissue which is not an acoustic match with water, are propelled upwardly with considerable force from the drum-head 16 when subjected to treatment. In one example, unrestrained meat resting on the drum-head was propelled upwardly through a ceiling tile in a room with a 10 foot ceiling.

Providing metal restraints on the meat as it rests on the drum-head prevents a desirable negative shock wave from forming. Therefore, any restraints need to have an approximate mechanical impedance match with water. One approach is a meat holder in the form of a rotating wheel comprising an inflated toroid, i.e. a donut or ring-shaped device, which touches the drum head. The toroid used in some tests was a typical tire inner tube, presumably made of natural rubber, and inflated with air; the rubber is a mechanical impedance match with water. Various rubbers can be used, including vulcanized pure gum rubber and polyurethane rubber. Other rubbers can be routinely tested for suitability.

The thickness of the rubber wall should be no greater than about 3/8 of an inch, i.e. 0.95 cm, and is preferably as thin as possible consistent with providing sufficient durability. Thicknesses greater than 0.95 cm should be avoided because greater thicknesses will undesirably reduce the negative shock wave. The inner tube used in initial tests had a wall thickness of about 1/8 of an inch, i.e. about 0.32 cm.

Other structures can be used in place of the aforementioned inner tube, e.g. a foam plastic or rubber roller such as a roller formed of foamed polyurethane either with or without a skin. However, such a foamed structure, comprising more solid material than an inflated toroid or the like as described above, will produce a smaller negative shock wave, which is undesirable.

In the use of such a meat holder, the meat, e.g. deboned chicken or beef, is fed to the drum-head by the feeding conveyor where it is grasped and held in place by the inflated meat holder, at which point the meat is "shot" by discharge from the electrodes 124, allowing the positive shock wave to pass through the water above the electrodes, through the drum-head 16 and through the meat. When the shock wave reaches the inflated meat holder, it passes through its wall and sees air. The wave then returns through the tube wall and the meat as a negative wave, breaking more of the tough connective fibers of the meat which make the meat tough, thus providing tenderized meat.

During the transition of the positive shock wave through the meat, and due to the tough connective fibers (myofibrular tissue) being not an acoustic or mechanical impedance match with the water and meat fibers, the meat is propelled upwardly causing momentary deformation of the inflated meat holder. However, the air pressure in the meat holder and its elasticity quickly return the meat to the drum-head. This upward excursion and return consume about 30 milliseconds.

To ensure that the meat does not fall off the drum-head either when it is propelled upwardly or returned downwardly, it is desirable to provide side guides. In the event that the meat were to be touching the side guides prior to transmission of the shock wave through the meat, the side guides should be of a material having approximately a mechanical impedance match with water; otherwise the reflected wave from the side guides would be positive, thus canceling the desirable negative wave returning from above. Accordingly, the side guides are preferably made of a plastic having a reasonable mechanical impedance match with water, e.g. Tygon, polyethylene, polyurethane, polypropylene or gum rubber. Suitable plastics can be routinely tested. In one embodiment, there are used Tygon sheets having a thickness of about ¼ of an inch, i.e. about 0.64 cm, held in a metallic "picture" frame along the periphery of each of the sheets.

The side guides can be avoided by the use of an appropriately shaped meat holder. Thus, instead of a tire tube which has a circular cross-section, a roller can be used with a rectangular cross-section, or with a meat-facing surface which in cross-section has a concave configuration, whereby the opposite edges or the rotating meat holder serve to hold the meat in place.

It is indicated above that the meat may be introduced to the drum-head by a more or less conventional conveyor system, and pushed across the drum-head by the meat on the conveyor system. However, this system is less reliable than is desired. For example, chicken breasts sometimes pile up and go to the sides, making it more difficult to control the thickness of the chicken breast stack when on the drum-head. The use of a roller or inflated inner tube such as described above solves the problem by positively rotating the driven wheel at a peripheral velocity of the meat contacting surface which matches the velocity of the conveyor belts. A downward force from the meat holder of about 3 psi will carry the stack of meat across the drum-head, although of course greater pressures can be used, and even lesser pressures with somewhat less effectiveness. As indicated above, the wheel on which the meat holder is mounted is suitably driven and easily controlled at the desired rpm.

Instead of a driven wheel as illustrated and described above, the meat holder can instead be elongated in the direction of movement of the meat, e.g. in the nature of an inflated conveyor belt.

Figure 4:
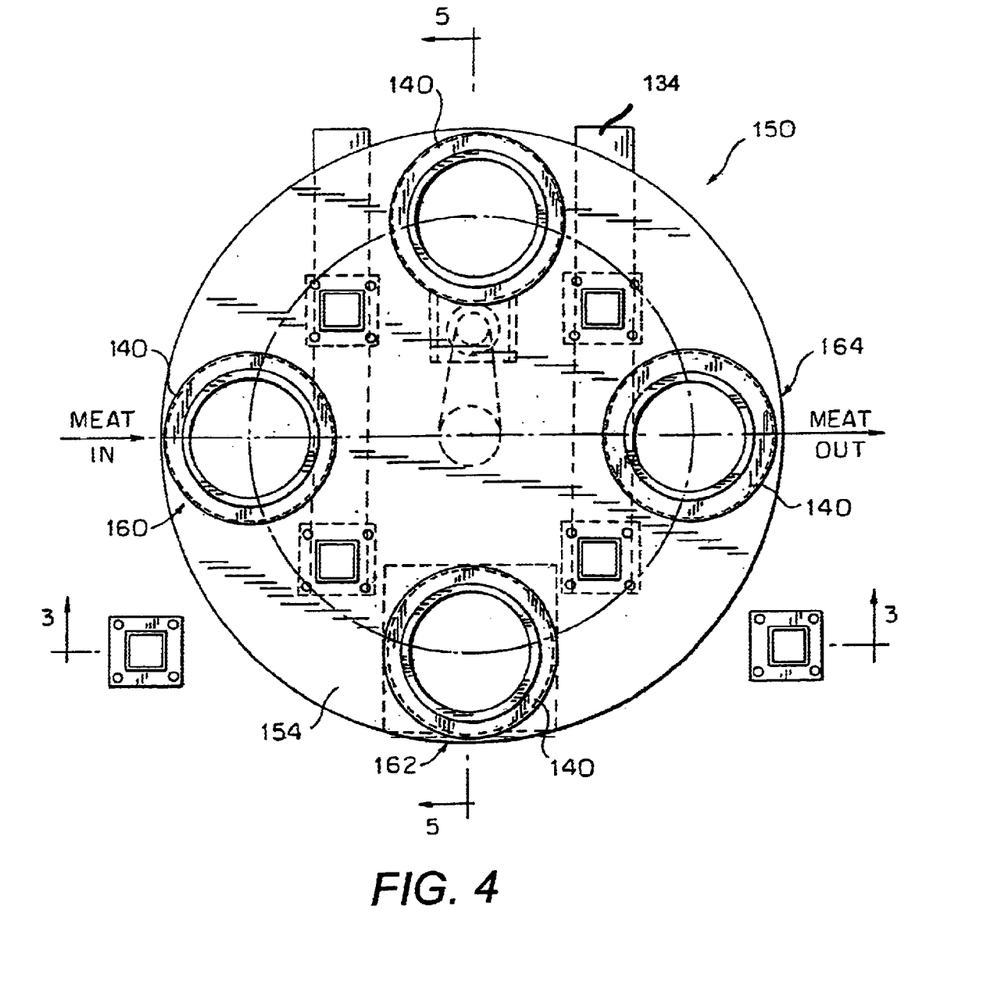
FIG. 4 is a top plan view of a conveyor system of the present invention in the form of an indexing carrousel having four positions including a meat-in first position, a meat treatment second position, and a meat-out third position.

According to a more preferred embodiment of the present invention as illustrated in FIGS. 1, 3 and 4, the meat treating cavity 14 is defined by a meat retaining ring 140 which forms the sidewall of the meat treating chamber 14, and a second drum-head 142 which forms the roof of the meat treating chamber 14, both the drum-head 142 and the meat retaining ring 140 being formed of a material having a mechanical impedance approximately the same as water, e.g. Tygon, polyurethane, polyethylene, polypropylene or gum rubber. In particular, the upper drum-head 142, which is part of a vertically reciprocal meat catcher 144, is preferably formed of the same material and is of the same size as the lower drum-head 16.

The meat retaining ring 140 is preferably formed of polyurethane. The wall thickness and shape of the meat supporting ring 140 is not critical, except that its thickness should be adequate to withstand the forces to which it is subjected during meat treatment; a wall thickness of about 1.5 cm for polyurethane has been found to be adequate during initial testing.

Figure 5:
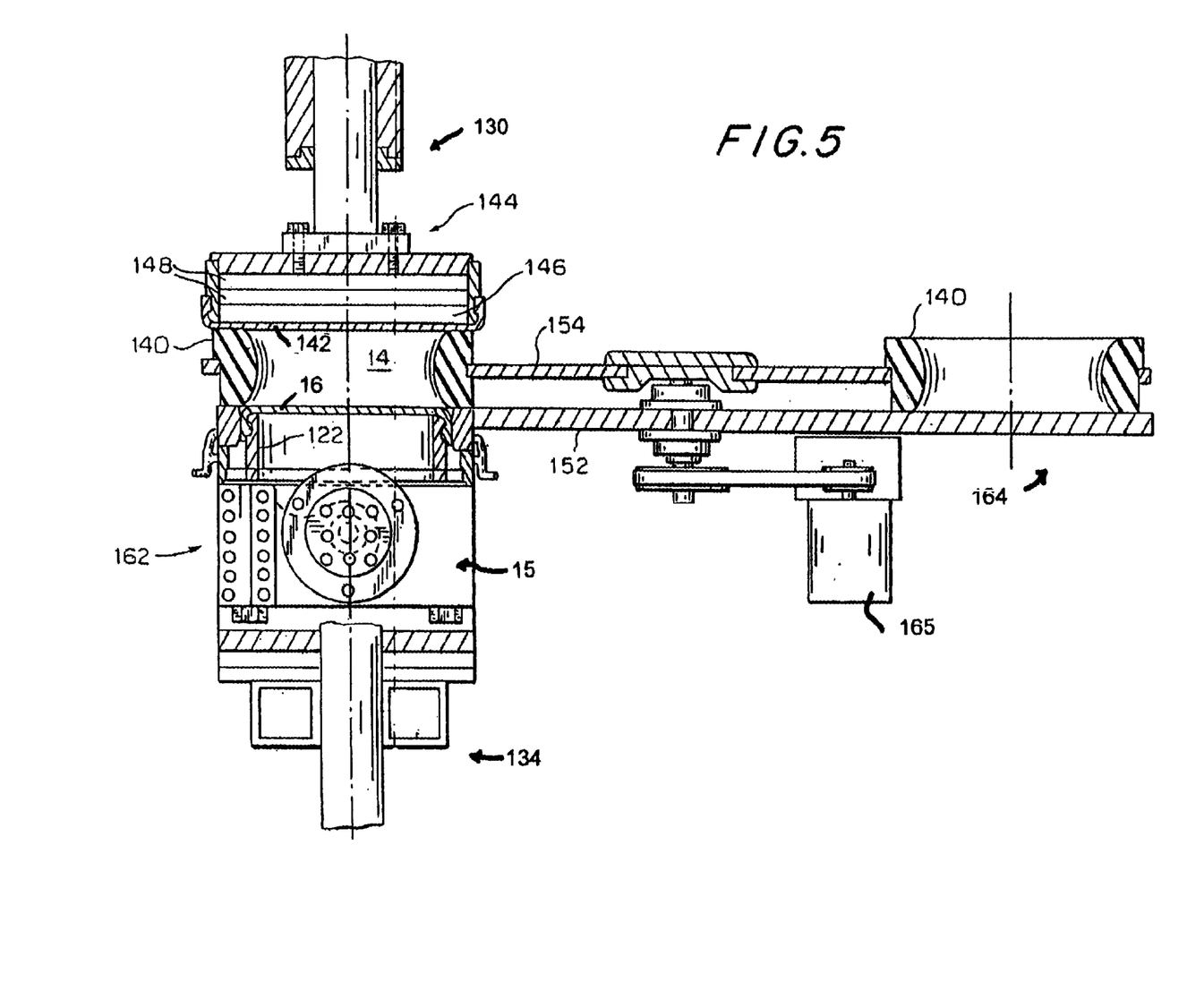
FIG. 5 is a sectional view along line 5—5 of FIG. 4.

As best shown in FIGS. 1 and 5, an air pocket or air cavity 146 is located above the upper drum-head 142, a steel plate 145 defining the opposite side of the cavity 146. Above the air pocket 146, there may optionally be placed one or more rubber or plastic foam layers 148 as shown in FIG. 5, although these foam layers 148 are unnecessary and therefore are not preferred. The air pocket or cavity 146 is important in this embodiment for the reasons pointed out above, i.e. after the shock wave passes through the meat and the upper drum-head 142, it should see air and then return through the upper drum-head 142 and the meat as a negative wave.

While a foam pad can replace the air cavity 146, such a foam pad comprises additional solid material which will therefore produce a smaller negative shock wave, as already described above.

The height of the air cavity 146 in the illustrated embodiment is desirably about 2 cm, although this dimension is not critical; functionally, the height should be a minimum sufficient to produce an effective negative wave, and a maximum to prevent undue stretching of the drum-heads 16 and 142. Other dimensions can be determined on the basis of routine testing.

In a simple form of the embodiment as illustrated in FIG. 1, the meat is placed in the food processing chamber 14, and the pneumatic or hydraulic cylinder 130, supported by an upper support structure 132, is moved downwardly to the illustrated position in which the upper drum-head 142 just touches the meat, or wherein the meat is slightly compressed between the upper drum-head 142 and the lower-drum head 16. The electrodes 124 of the capacitor discharge unit 15 are then fired causing the shock wave to pass upwardly through the firing chamber 12 as previously described, then through the lower drum-head 16, through the meat, and then through the upper drum-head 142 where the shock wave meets air in the air cavity 146, and returns as a negative wave. When the shock wave initially hits the meat, it propels the meat upwardly followed by the lower drum-head 16. Movement is limited by the height of air cavity 146.

More preferably, the apparatus described immediately above is incorporated into a rotary carousel conveyor as best shown in FIGS. 4 and 5. In the system as shown in FIG. 4, the rotary carousel 150 has four positions, each spaced 90° from one another, three of which positions are functional. The carousel 150 is provided with four meat supporting rings 140. As shown in FIG. 4, at rest during intermittent or stepped operation, each of the rings 140 is located at one of the four positions. At a level corresponding with the bottom of each meat supporting ring 140 is a stationary plate 152, preferably of stainless steel, and a rotatable indexing plate 154 which is rotatable and is driven by a indexing motor 165 as shown in FIG. 5, the indexing plate 154 having four openings within which fit the four meat supporting rings 140.

Meat is fed in from the top at the first position 160 so that it rests on the stationary plate 152 within one of the meat supporting rings 140. The indexing motor then causes rotation of the indexing plate so that the meat and the meat supporting ring 140 slide along the stationary plate 142 to the second position 162, which is the firing position as shown in FIGS. 1–3 and 5. At this position, the stationary plate 152 has an opening therethrough within which resides the structure of the firing chamber 12. When the meat within the meat support ring 140 reaches the carousel's second position 162, the pneumatic or hydraulic cylinder lowers the meat catcher 144 to the position shown in FIGS. 1 and 5, and the meat is "shot" by discharging the electrodes 124.

Then the pneumatic or hydraulic cylinder raises the meat catcher 144 and the indexing motor rotates the indexing plate 154 to move the treated meat and the meat supporting ring 140 to the third position 164 where the stationary plate 152 has another opening therethrough, so that the treated meat falls through the opening in the stationary plate 152 to a treated meat receiving area, e.g. a meat removing conveyor or a packaging station.

As can be clearly see from FIG. 4, in the illustrated embodiment each intermittent movement is over 90° and the fourth position is non-functional. It will be readily apparent that considerable variations are possible, e.g. three positions could be provided with the indexing occurring over 120° rather than 90°; or five positions could be provided, with the indexing occurring over 72° rather than 90°.

The present invention can be carried out in conjunction with other treatments. For example, in the chicken industry, boneless and skinless chicken breasts are an important product. It has been discovered that chicken meat cannot be removed from the breast bone for at least 6 hours following slaughter of the chicken, and in many plants the slaughtered birds are kept refrigerated or on ice over night. As the chicken meat goes through rigor mortis, it wants to bunch up, but if it is still on the bone the attachment of the meat to the bone prevents such bunching up. However, after rigor mortis is complete, i.e. after about 6 hours or so, the meat can be removed from the bone and is relatively tender. But if the chicken is removed prior to completion of rigor mortis, what results is so-called "rubber chicken" which, until the Hydrodyne system, no known process could tenderize.

Keeping the chicken breasts for 6 hours or overnight following slaughter of the chickens requires considerable storage space as well as ice or refrigeration energy, and thus adds significantly to the cost of preparation. Therefore, the chicken industry has desperately sought ways to eliminate the storage of chicken breasts before their removal from the bone. One prior operation which has helped is electric stimulation, which is electrocution of the chicken as it is dying. Such electric stimulation accelerates rigor mortis, so that instead of waiting for 6 to 10 hours, rigor mortis can occur in as little as 1 to 2 hours. Electric stimulation was attempted in the chicken industry, with early deboning 1 to 2 hours after death of the chicken. However, the results were unsatisfactory in that only 60–70% of the chicken breasts were tender, so electric stimulation was abandoned.

It has now been discovered in accordance with another aspect of the present invention that electric stimulation is effective when used in conjunction with the Hydrodyne system, including prior embodiments or the embodiments disclosed above. If the chicken is electrically stimulated, e.g. 190 volts for 10 seconds, the meat experiences rigor mortis in 1 to 2 hours rather than the 6 to 8 hours normally required. Chicken meat so electrically stimulated can be deboned shortly after electric stimulation and then subjected to Hydrodyne treatment, e.g. in accordance with the embodiments disclosed above. Chicken breasts so prepared are fully tender, and the 6–8 hours normally required for aging on ice are eliminated.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. In a method of tenderizing meat and/or killing microbes in meat comprising subjecting meat to a shock wave propagated through a non-compressible fluid, the improvement wherein placing said meat on a solid layer having an acoustic impedance approximately the same as the acoustic impedance of said non-compressible fluid, said non-compressible fluid lying adjacent one surface of said solid layer and said meat being supported on an opposite surface of said solid layer;

restricting movement of said meat when subjected to said shock wave; and exposing said shock wave to a zone of reduced acoustic impedance after passage through said meat to create a rarefaction wave which passes through said meat in a direction opposite said shock wave.

2. The method of claim 1 further comprising orienting said meat during treatment such that said shock wave comes from below said meat, and restraining upward movement of said meat with a flat surface thereabove during shock wave treatment, and further confining said meat along the sides thereof during shock wave treatment.

3. The method of claim 1 comprising generating said shock wave by capacitive discharge in a parabolic chamber beneath said meat, and propagating said shock wave upwardly through a cylindrical chamber having an angle of inclination of 0–8°.

4. The method of claim 1 wherein said meat comprises boneless chicken, and wherein, prior to subjecting said boneless chicken to said shock wave, a chicken from which said boneless chicken has been taken is subjected to electric stimulation.

5. The method of claim 4 wherein said electric stimulation is carried out approximately 1–2 hours prior to said shock wave treatment.

6. Apparatus suitable for the method of claim 1, comprising a capacitor discharge chamber having an upwardly facing parabolic-shaped lower portion with a pair of electrodes positioned to create a capacitor discharge at the focal point of said lower portion, and a cylindrical upper portion having an angle of inclination of 0–15°, said capacitive discharge chamber being adapted to contain an incompressible fluid having a first acoustic impedance;

a meat supporting layer disposed above said capacitor discharge chamber, said meat supporting layer having a bottom surface adapted to be in contact with said non-compressible fluid when said apparatus is in use, said meat supporting layer having an acoustic impedance approximately the same as said first acoustic impedance;

structure for restraining excessive movement upwardly of the meat when subjected to a shock wave by capacitive discharge between said electrodes; and space above the location of the meat when the apparatus is in use, which space has a second acoustic impedance which is less than said first acoustic impedance so as to create a rarefaction wave which passes through the meat in a direction opposite to the shock wave.

7. Apparatus according to claim 6 wherein said meat supporting layer is a drum-head formed of a flexible material.

8. The apparatus of claim 7 wherein said drum-head is formed of gum rubber.

9. The apparatus of claim 7 wherein said structure for restraining excessive movement upwardly of the meat when subjected to a shock wave comprises a second drum-head formed of a flexible material, said flexible material having an acoustic impedance approximately the same as said first acoustic impedance, said second drum-head being adapted for placement over and in contact with the meat during use of the apparatus; and wherein said space above the location of the meat comprises an air cavity above said second drum-head.

10. The apparatus of claim 9 further comprising a meat retaining ring to define, in combination with said first named drum-head and said second drum-head, a meat processing chamber.

11. Apparatus according to claim 10 wherein said meat retaining ring comprises a material having an acoustic impedance approximately the same as said first acoustic impedance.

12. Apparatus according to claim 10 comprising a pneumatic or hydraulic cylinder for reciprocating upwardly and downwardly said second drum-head and said air cavity.

13. The apparatus of claim 6 wherein said upper portion of said capacitor discharge chamber has an angle of inclination of 0–8° and a height which is less than its radius.

14. The apparatus of claim 13 wherein said upper portion of said capacitor discharge chamber has an angle of inclination of 0–2°.

15. The apparatus of claim 13 wherein said upper portion of said capacitor discharge chamber has an angle of inclination of 0°.

16. In a method of tenderizing meat and/or killing microbes in meat comprising subjecting meat to a shock wave propagated through a non-compressible fluid, the improvement comprising placing said meat adjacent a first surface of a solid layer having an acoustic impedance approximately the same as the acoustic impedance of said non-compressible fluid, said non-compressible fluid lying adjacent a second surface of said solid layer;

restricting movement of said meat when subjected to said shock wave; and exposing said shock wave to a zone of reduced acoustic impedance after passage through said meat to create a rarefraction wave which passes through said meat in a direction opposite said shock wave.

17. The method of claim 16 comprising generating said shock wave by capacitive discharge in a parabolic chamber, and propagating said shock wave through a cylindrical chamber having an angle of inclination of 0–8°.

18. The method of claim 16 wherein said meat comprises boneless chicken, and wherein, prior to subjecting said boneless chicken to said shock wave, a chicken from which said boneless chicken has been taken is subjected to electric stimulation.

19. The method of claim 18 wherein said electric stimulation is carried out approximately 1–2 hours prior to said shock wave treatment.

20. Apparatus suitable for the method of claim 16, comprising a capacitor discharge chamber comprising a parabolic-shaped first portion with a pair of electrodes positioned therewithin to create a capacitor discharge at the focal point of said first portion, and a cylindrical second portion extending from said parabolic-shaped first portion, said cylindrical second portion having an angle of inclination of 0–15°, said capacitive discharge chamber being adapted to contain an incompressible fluid having a first acoustic impedance;

a meat contacting layer disposed adjacent said capacitor discharge chamber, said meat contacting layer having one surface adapted to be in contact with said non-compressible fluid when said apparatus is in use, said meat contacting layer having an opposite surface adapted to be in contact with the meat when the apparatus is in use, and said meat contacting layer having an acoustic impedance approximately the same as said first acoustic impedance;

structure for restraining excessive movement of the meat when subjected to a shock wave by capacitive discharge between said electrodes; and space located at a position on a side of the meat opposite said meat contacting layer when the apparatus is in use, which space has a second acoustic impedance which is less than said first acoustic impedance so as to create a rarefaction wave which passes through the meat in a direction opposite to the shock wave.

21. Apparatus according to claim 20 wherein said meat contacting layer is a drum-head formed of a flexible material.

22. The apparatus of claim 21 wherein said drum-head is formed of gum rubber.

23. The apparatus of claim 20 wherein said cylindrical second portion has an angle of inclination of 0–8° and a height which is less than its radius.

24. The apparatus of claim 21 wherein said structure for restraining excessive movement of the meat when subjected to a shock wave comprises a second drum-head formed of a flexible material, said flexible material having an acoustic impedance approximately the same as said first acoustic impedance, said second drum-head being adapted for placement in contact with the meat and adjacent said space whereby, when the apparatus is in use, said second drum-head lies between said space and the meat and in contact with the meat.

25. The apparatus of claim 24 further comprising a meat retaining ring to define, in combination with said first named drum-head and said second drum-head, a meat processing chamber.

26. The apparatus according to claim 25 wherein said meat retaining ring comprises a material having an acoustic impedance approximately the same as said first acoustic impedance.

27. In a method of tenderizing meat and/or killing microbes in meat comprising subjecting meat to a shock wave propagated through a non-compressible fluid, the improvement comprising placing said meat adjacent a first surface of a drum-head diaphragm having an acoustic impedance approximately the same as the acoustic impedance of said non-compressible fluid, said non-compressible fluid lying adjacent a second surface of said drum-head diaphragm, said drum-head diaphragm separating said meat from said non-compressible fluid; and restricting movement of said meat when subjected to said shock wave passing through said non-compressible fluid and then through said drum-head diaphragm and into said meat.

28. The method of claim 27 comprising generating said shock wave by capacitive discharge in a parabolic chamber, and propagating said shock wave through a cylindrical chamber having an angle of incliniation of 0–8°.

29. The method of claim 27 wherein said meat comprises boneless chicken, and wherein, prior to subjecting said boneless chicken to said shock wave, a chicken from which said boneless chicken has been taken is subjected to electric stimulation.

30. The method of claim 29 wherein said electric stimulation is carried out approximately 1–2 hours prior to said shock wave treatment.

31. Apparatus suitable for the method of claim 27, comprising a chamber for containing an incompressible fluid having a first acoustic impedance, and a device for generating a shock wave within the incompressible fluid in said chamber;

a drum-head diaphragm disposed adjacent said chamber, said drum-head diaphragm having one surface adapted to be in contact with said incompressible fluid when said apparatus is in use, said drum-head diaphragm having an opposite surface adapted to be in contact with the meat when the apparatus is in use, and said drum-head diaphragm having an acoustic impedance approximately the same as said first acoustic impedance; and structure for restraining excessive movement of the meat when subjected to a shock wave passing through the incompressible fluid and then through said drum-head diaphragm and into the meat.

32. The apparatus of claim 31 wherein said drum-head diaphragm is formed of gum rubber.

33. The apparatus of claim 31 wherein said structure for restraining excessive movement of the meat when subject to a shock wave comprises a second diaphragm formed of a flexible material, said flexible material having an acoustic impedance approximately the same as said first acoustic impedance, said second diaphragm being adapted for placement in contact with a surface of the meat opposite the surface of the meat in contact with the said drum-head diaphragm, when the apparatus is in use.

34. The apparatus of claim 33 further comprising a meat retaining ring to define, in combination with said drum-head and said second drum-head diaphragm, a meat processing chamber.

35. The apparatus according to claim 33 wherein said meat retaining ring comprises a material having an acoustic impedance approximately the same as said first acoustic impedance.

* * * * *